United States Patent
Dubosc et al.

(10) Patent No.: US 10,436,405 B2
(45) Date of Patent: Oct. 8, 2019

(54) LIGHTING MODULE FOR THE LIGHTING AND/OR SIGNALLING OF A MOTOR VEHICLE

(71) Applicant: Valeo Vision, Bobigny (FR)

(72) Inventors: Christophe Dubosc, Bobigny (FR); Samira Mbata, Bobigny (FR); Nicolas Lefaudeux, Bobigny (FR); Thibaud Barillot, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 16/129,065

(22) Filed: Sep. 12, 2018

(65) Prior Publication Data
US 2019/0078746 A1    Mar. 14, 2019

(30) Foreign Application Priority Data
Sep. 12, 2017    (FR) .................................... 17 58437

(51) Int. Cl.
| | |
|---|---|
| *F21V 7/00* | (2006.01) |
| *F21S 41/275* | (2018.01) |
| *B60Q 1/00* | (2006.01) |
| *F21V 5/04* | (2006.01) |
| *F21S 41/265* | (2018.01) |
| *F21S 43/20* | (2018.01) |

(Continued)

(52) U.S. Cl.
CPC .......... F21S 41/275 (2018.01); B60Q 1/0041 (2013.01); F21S 41/148 (2018.01); F21S 41/265 (2018.01); F21S 43/14 (2018.01); F21S 43/26 (2018.01); F21V 5/045 (2013.01); F21W 2103/55 (2018.01)

(58) Field of Classification Search
None
See application file for complete search history.

(56) References Cited

U.S. PATENT DOCUMENTS

| | | |
|---|---|---|
| 6,152,589 A | 11/2000 | Kawaguchi et al. |
| 6,155,702 A | 12/2000 | Blusseau et al. |

(Continued)

FOREIGN PATENT DOCUMENTS

| | | |
|---|---|---|
| DE | 195 19 872 A1 | 12/1996 |
| DE | 10 2012 021163 A1 | 5/2014 |

(Continued)

OTHER PUBLICATIONS

French Preliminary Search Report dated Jun. 8, 2018, in French Application 1758437 filed Sep. 12, 2017 (with English Translation of Categories of Cited Documents).

*Primary Examiner* — Vip Patel
(74) *Attorney, Agent, or Firm* — Oblon, McClelland, Maier & Neustadt, L.L.P.

(57) ABSTRACT

A lighting module includes at least one light-emitting assembly and one lens for shaping the emitted light rays, the lens having an entrance face for the light rays and an exit face. The lens is a flat lens, the lens and the emitting assembly being configured so that the exit face includes a first section and a second section that differ in the amount of light rays exiting from the lens via one or other of these sections in order that the first section forms an optical section and in order that the second section forms a lighting neutral section. The second section extends from the first section in order to have a largest dimension that is larger than the thickness of the flat lens, the exit face of the lens including features over the entirety of its area.

20 Claims, 4 Drawing Sheets

(51) Int. Cl.
*F21S 41/148* (2018.01)
*F21S 43/14* (2018.01)
*F21W 103/55* (2018.01)

(56) References Cited

U.S. PATENT DOCUMENTS

2015/0138821 A1 5/2015 Kosuge et al.
2017/0328528 A1 11/2017 Hoffmeister

FOREIGN PATENT DOCUMENTS

| | | |
|---|---|---|
| EP | 0 806 604 A1 | 11/1997 |
| FR | 2 770 618 A1 | 5/1999 |
| WO | WO 2016/041983 A1 | 3/2016 |

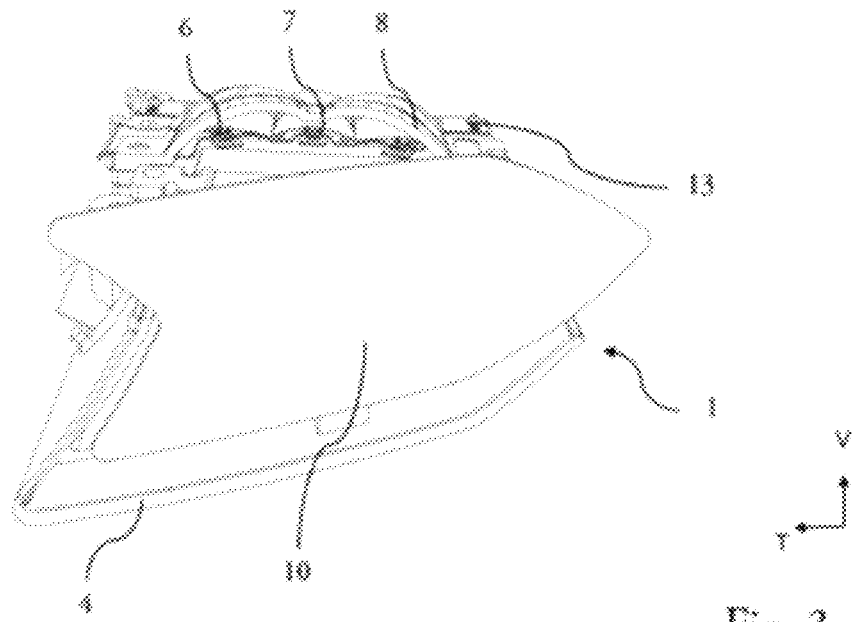
Fig. 3
Fig. 4
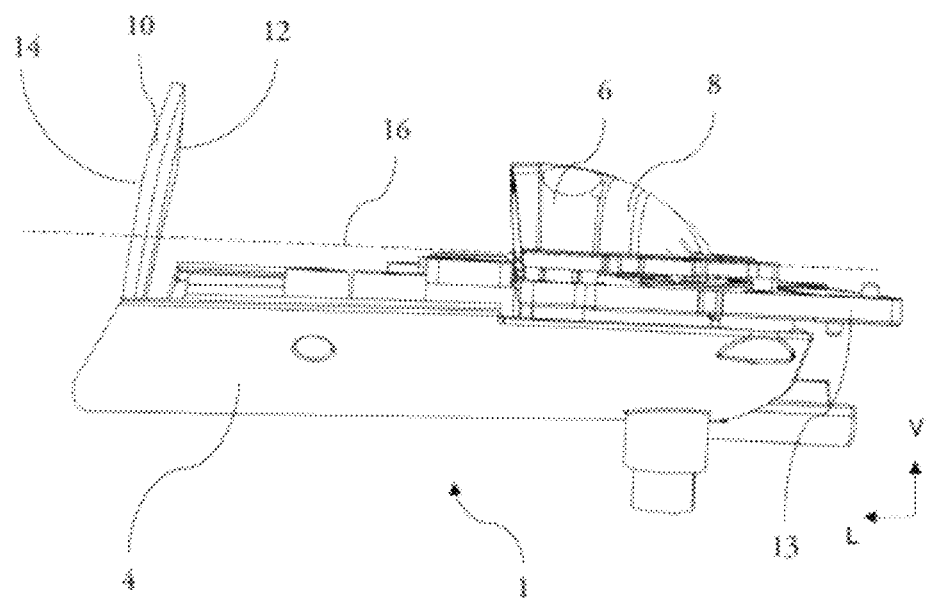

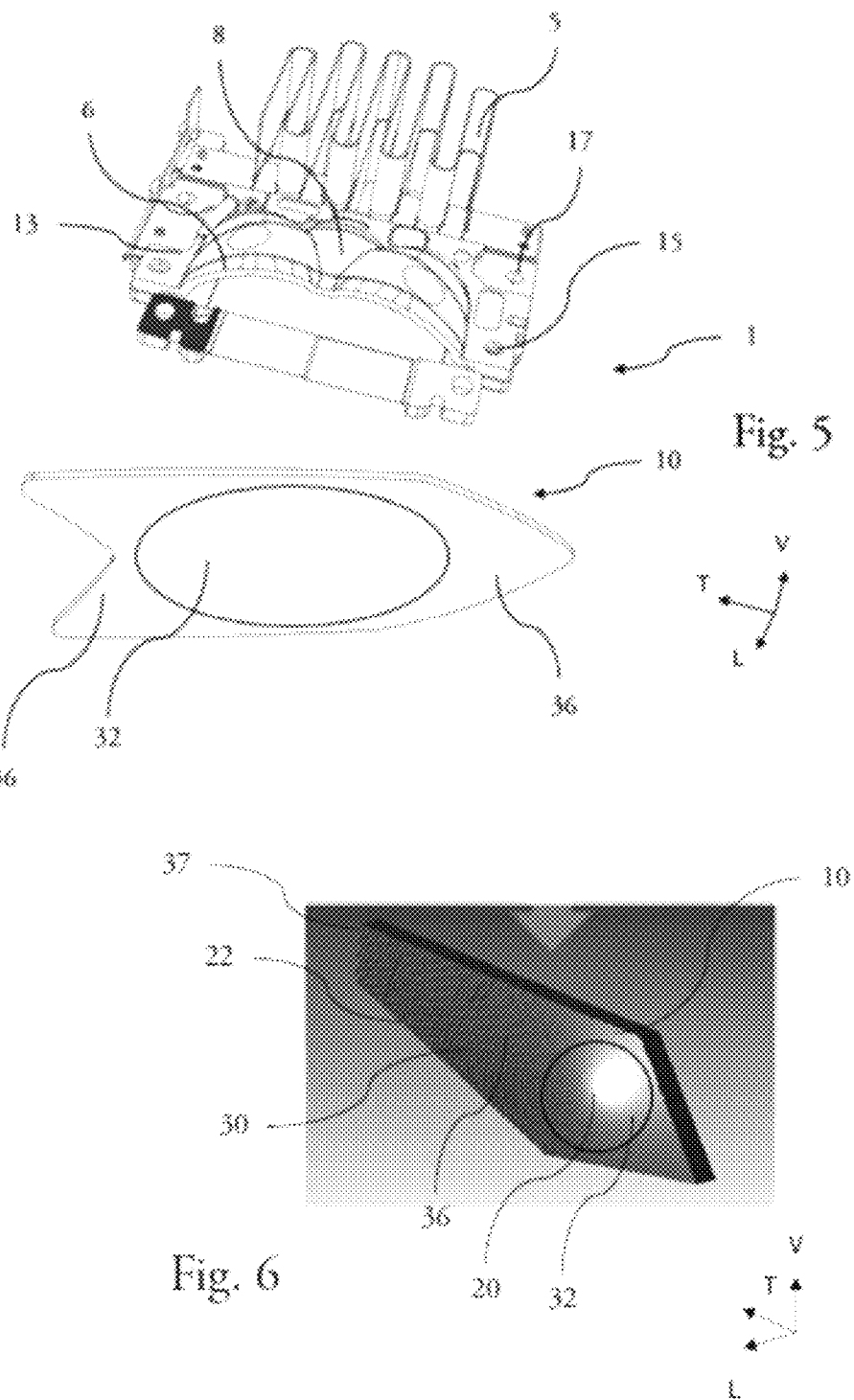

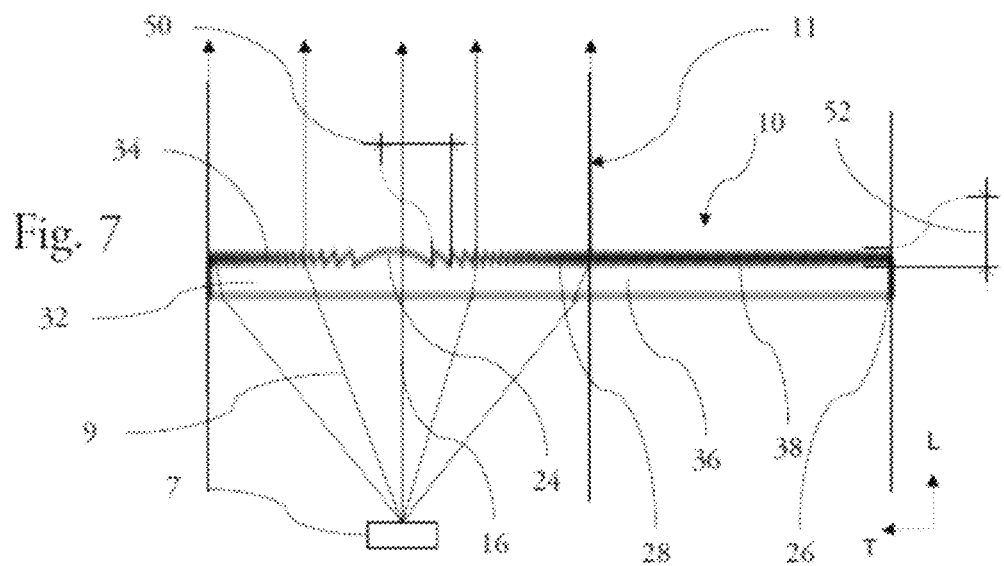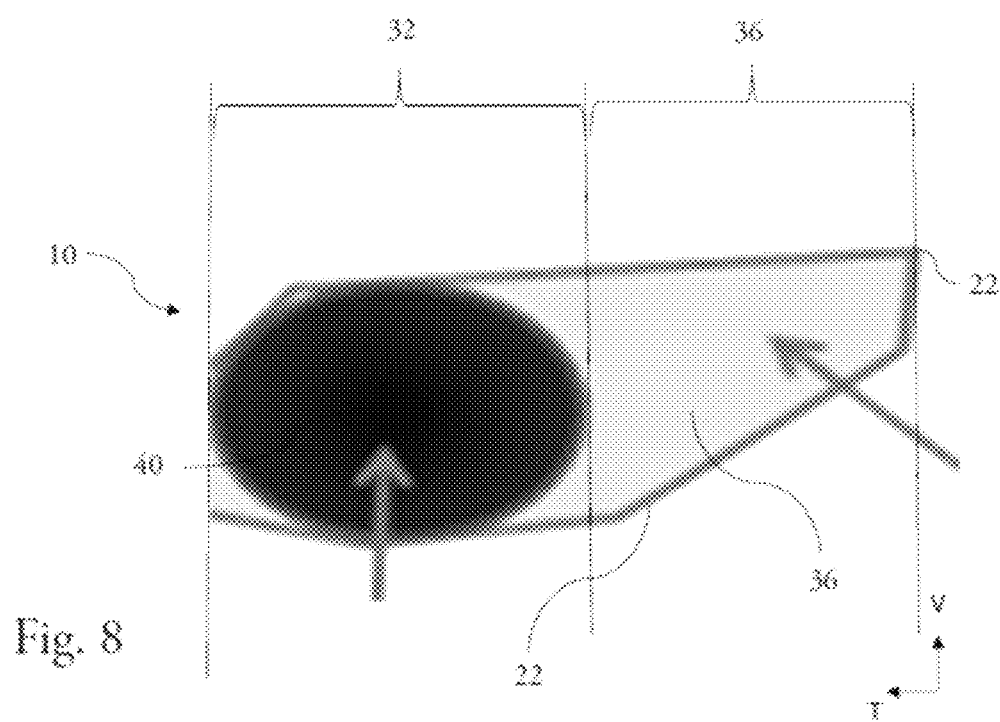

LIGHTING MODULE FOR THE LIGHTING AND/OR SIGNALLING OF A MOTOR VEHICLE

The technical field of the invention is that of lighting modules, for motor-vehicle lighting and/or signalling.

Motor vehicles are equipped with lighting modules, allowing the projection of a beam allowing the route along which the vehicle is progressing to be lit, or even signals to be transmitted from the vehicle to another road user.

These lighting modules in general include at least one light source and at least one optical deviating element arranged to deviate the light rays emitted by the light source toward at least one shaping lens so as to obtain a light beam meeting both the needs of the user of the vehicle and regulatory standards, independently of whether they are with respect to lighting or to signalling. The light rays are formed into a light beam by one or more optical elements such as shaping lenses.

Convergent lenses, for example spherical or aspherical lenses, that are able to effectively convert the rays passing through the lens into a regulatory light beam are known. This type of lens imposes a set overall shape on the lighting module, the lens in particular having a thickness of about a few millimetres at its edge and a few tens of millimetres at its centre. This overall shape may be sizeable and occupy a substantial space in the vehicle, in particular if several lighting modules are used, or if a particular shape is desired. In addition, the use of such a convergent lens drastically limits possible modifications of the outline of the lens and of the ray exit faces of the lighting modules, whereas headlamps, which are important elements in the visual signature specific to each model of vehicle, may be required to be increasingly slender in shape.

The objective of the invention that is the subject of the present document is to propose a lighting module that satisfactorily addresses issues of lighting and/or signalling required to meet regulatory standards, issues of compactness and issues of style.

To this end, the present invention proposes a lighting module for the lighting and/or signalling of a motor vehicle, including at least one light-emitting assembly and one lens for shaping the rays emitted by the emitting assembly, said lens having an entrance face for the rays, which face is turned toward the emitting assembly, and an exit face, which face is opposite the entrance face, characterized in that the lens for shaping the rays is a flat lens, said lens and the emitting assembly being configured so that the exit face includes a first section and a second section that differ in the amount of light rays exiting from the lens via one or other of the sections so that the first section forms a lighting optical section and so that the second section forms a lighting neutral section, characterized in that the second section extends from the first section so as to have a largest dimension that is larger than the thickness of the flat lens, and characterized in that the exit face of the lens includes features over the entirety of its area.

The first section of the exit face is a lighting optical section in that a large majority, for example at least 90%, of the total light flux emitted by the emitting assembly to provide a regulatory lighting function passes through the lens in this section of the exit face.

The second section of the exit face is a lighting neutral section in the sense that the second section is said to be lighting neutral provided that a minority, for example less than 10%, of the total light flux emitted by the emitting assembly to provide a regulatory lighting function passes through the lens in this section of the exit face. More particularly, less than 5% of the light rays 9 emitted by the emitting assembly reach a second section 36 of the lens 10, whereas the area of the second section is at least equal to 30% of the area of the first section.

A largest dimension of the second section is defined as its largest dimension, in the plane of the lens, from an edge of the first optical section to an edge of the flat lens. The ratio between this largest dimension and the dimensions of the lens in its entirety is such that the lighting neutral second section consists, according to the invention, in an extension of the optical section beyond the reach of the rays emitted by the emitting assembly and deviated inside the lens, and not to a perimeter of the optical section optically processing the most divergent rays. As a result, according to the invention, the features placed on the exit face in the second section have an aesthetic function, and have no impact on the optical function provided by the rays emitted by the emitting assembly. Thus, it is possible to advantageously adjust the shape of this second section, which has no impact on the lighting optical function provided by the combination of the emitting assembly and of the first section of the lens.

The expression "emitting assembly" is understood to mean that the lighting module may include one or more light sources forming a given emitting assembly, the latter being positioned, with respect to the object focal plane of the flat lens, and where appropriate associated with a reflector, to direct the rays suitably onto the entrance face of the lens, in order that the rays emitted by this emitting assembly mainly exit via the first section of the exit face of the lens.

The expression "flat lens" or "not very curved lens" is understood to mean a lens the average thickness of which is small with respect to the diameter, or with respect to the largest dimension in the main plane of elongation of the lens. In other words, a lens is flat, or not very curved depending on the variation in thickness of the lens, if its average thickness is of a value lower than 20% of said diameter or of said largest dimension, whereas the same ratio for a spherical or aspherical convergent lens is about 50%.

Thus, it is possible with a single lens to provide a purely optical function, via the first section, and an essentially aesthetic function, via the second section. The use of a flat lens allows an essentially aesthetic section that is large in size, and where appropriate curved to follow a curvature of a wing into which a headlamp is inserted, to be more easily obtained, it being understood that it would be impossible to obtain this result with a conventional lens without increasing the thickness at the centre of the lens and therefore bulk, weight and cost.

In addition, the features employed on the flat lens to produce the optical function are also produced on the rest of the flat lens for an aesthetic effect aiming to give the observer an impression of continuity.

According to various attributes of the lighting module according to the invention, which may be implemented separately or in combination:

the emitting assembly and the lens are configured so that the rays emitted by the emitting assembly strike a small section of the entrance face of the lens. The expression "small section" is understood to mean that the rays emitted by the emitting assembly do not strike the entirety of the entrance face but only a specific zone, the size of this specific zone in which the rays strike the entrance face depending on the size to be given to the first section of the exit face;

the features extend continuously over the exit face of the lens. The term "continuously" is here understood to mean that a feature makes contact with at least one adjacent feature whatever the section in question. Thus, the features are arranged in a continuous series between the first and second sections, there being no transition between the first section and the second section. By way of example, in this context, provision will possibly be made for the features of the first section to be the same as those of the second section, or indeed for the variation, in the shape of or in spacing between the features, with distance from the optical axis of the lens, to be continuous right up to the edge of the lens;

the features are of a first type in the first section and of a second type in the second section, the first type and the second type of features differing in the nature, geometric shape and size of the features;

the features of the first type have a Fresnel structure, i.e. they take the form of prisms the size and inclination of which are defined depending on the optical power of the aspherical or spherical lens that they enable to be replaced. In particular, these prisms may have faces of right or curved profile depending on the optical power that it is desired to give to the lens;

the features of the second type form a graining of the second section of the exit face;

all of the features have a Fresnel structure, the features of the second type present in the second section having an inclination value of their face different from that of the features of the first type present in the first section. Thus, it is possible to adjust the amount of reflection or refraction of the rays in the second section having an aesthetic function, or it is possible to define a divergent optical power in this second section rather than the convergent optical power privileged in the first section;

the pitch of the Fresnel structure is constant over the entirety of the flat lens;

the lens has an exterior shape including at least one angular vertex, with a first section of overall circular or oval shape. It will be understood that it is the second section of the lens, with its lighting neutral function, that forms the angular portion of the lens, this slender portion possibly being sought for an aesthetic effect by automobile manufacturers or OEMs;

at least one of the features present in the lens is rotationally asymmetric. The expression "rotationally asymmetric features" is understood to mean that a feature lying at a given distance from the optical axis of the lens is not invariant in rotation about an axis of rotation, for example the optical axis. The features present in the first section of the lens, the rotational asymmetry of which is dependent on the potential glare caused to a user of the road that the lighting module participates in lighting, will possibly in particular differ from the features present in the second section of the lens, the rotational asymmetry of which aims to give the lighting module a visual signature. By way of example, at least one of the features present in the second section of the lens is rotationally asymmetric, so that this feature follows, around the axis of rotation defined above, complex curves that are not circular arcs, at least one portion of the exit face being covered with a device for modifying the transmission of the light. This device for modifying the transmission of the light may for example be an active element such as a liquid-crystal screen or a dynamic partitioning window, or indeed consist of a mask that allows a specific visual rendering to be achieved. The device may thus be placed in the first section or in the second section, at the interface between these two sections or even over the entirety of the exit face of the lens. Alternatively, a first device may cover the first section whereas a second ray device covers the second section;

the entrance face for the rays is convex. It will be understood here that the convexity of an entrance or exit face is defined with respect to the lens itself, i.e. with respect to a central layer thereof; in other words, the entrance face of the lens is convex in that it has a profile that is curved toward the exterior of the correcting optical element: the central portion of the entrance face is thus further toward the exterior of this lens than are the edges of this entrance face;

the lighting module includes an additional light source placed facing the lens so as to be located directly in line with the second section;

the lighting module includes an optic for shaping rays between said additional light source and the second section of the lens. The combination of a shaping optic and of this additional light source may for example allow a signalling function to be provided, and for example a daytime running light;

the lens is inclined with respect to a plane perpendicular to the optical axis. In particular, the lens may have an inclination-angle value ranging up to 10°.

The present invention also relates to a headlamp for a motor vehicle, said headlamp including a lighting module such as described above, the headlamp including a casing for housing at least this lighting module, said casing being closed by a protective outer lens.

Other attributes and advantages of the present invention will become more clearly apparent from the description and from the drawings, in which:

FIG. 3 is a front view of one of the lighting modules of FIG. 2, a portion of the casing having been removed to allow the internal components of the module to be seen;

FIG. 4 is a side view of the lighting module of FIG. 3;

FIG. 5 is an exploded view of the lighting module illustrated in FIGS. 3 and 4, in particular allowing a specific shaping lens according to one aspect of the invention to be seen;

FIG. 6 is a perspective view of a shaping lens, allowing the features to be seen;

FIG. 7 is a top view of the shaping lens and of the emitting assembly, the path of the rays emitted by the lens having been shown in order to allow the lighting optical portion and the neutral portion of the flat lens to be distinguished; and FIG. 8 is a front view of the shaping lens allowing a light spot in the optical section to be illustrated.

It will firstly be noted that although the figures illustrate the invention in detail with regard to implementation thereof and that they may, where appropriate, be used to better define the invention, these figures illustrate only some of the possible embodiments according to the invention.

In the rest of the description, the terms "axial", "longitudinal", "vertical" and "transverse" refer to an axis corresponding to the general direction of the rays emitted by the light source. The axial direction and the longitudinal direction L correspond to the general direction of the light rays emitted by the light source. The forward direction is the direction of emission of the light rays by the light source, the backward direction being, for its part, the opposite direction. The vertical direction V corresponds to a direction perpendicular to the longitudinal direction and to the plane in which the vehicle in which the lighting module or headlamp according to the invention is installed mainly extends. The transverse direction T is the direction perpendicular to the vertical direction V and to the longitudinal direction L.

The aforementioned directions have also been shown in the figures by an axis system L, V, T.

Figure 1:
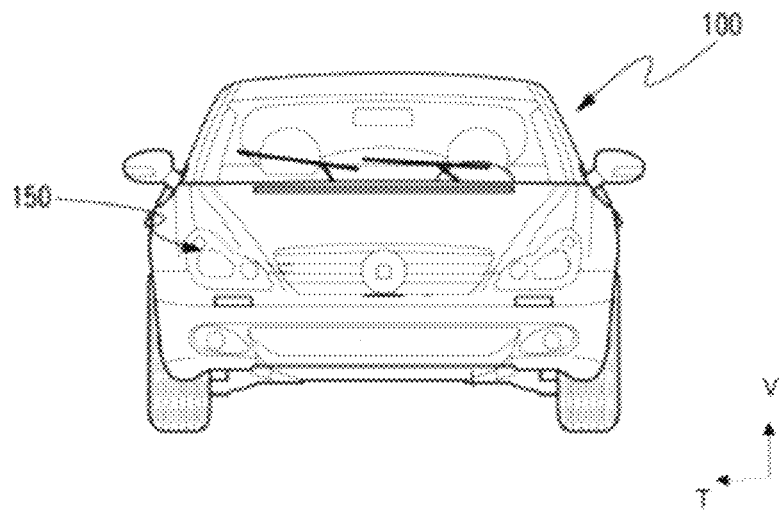
FIG. 1 is a front view of a vehicle including a motor-vehicle headlamp according to the invention.

FIG. 1 shows a motor vehicle 100 equipped with a headlamp 150 according to the invention. In this arrangement, the headlamp 150 allows the road in front of the vehicle 100 to be lit and/or the presence of the vehicle to be signalled to other road users. The headlamp 150 is here arranged at the front of the vehicle 100, on each side of the vehicle 100, but it will be understood on reading what follows that the headlamp 150 may also be used on other sides and in particular at the rear of the vehicle 100, and that a vehicle 100 may comprise a plurality of headlamps 150 placed on more than one side of the vehicle 100.

Here the shown headlamp 150, which extends partially over one wing of the vehicle 100, has a slim shape. In this headlamp 150 are arranged, behind a protective outer lens, three lighting modules 1, two lighting modules having a discrete shape and one lighting module, which is used for lighting function of the vehicle, having a shape that is more elongate and that, according to the invention, such as will be described below, is arranged so as to have a lighting optical section and a lighting neutral section.

Figure 2:
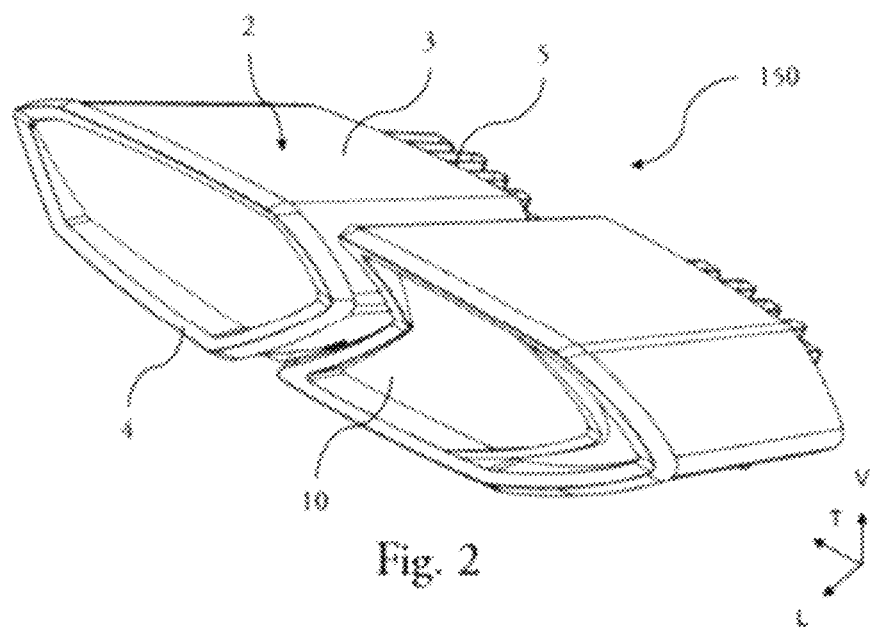
FIG. 2 is a perspective view of a vehicle headlamp according to the invention, including two lighting modules.

FIG. 2 illustrates a headlamp 150 according to one embodiment of the invention, noteworthy in that it includes two lighting modules 1 according to the invention, namely two lighting modules 1 configured so that only one portion of a shaping lens 10 is struck by the rays emitted by a light source, such as will be described below. The lighting module 1 includes a casing 2, which is configured to house various optical components including a lens 10 for shaping light rays, and a sink 5. The headlamp 150 is closed at the front by a protective outer lens that is intended to protect the lighting module 1 and its constituent elements from insects and debris that could damage the headlamp 150 or prevent it from operating correctly.

The casing 2 is composed of an upper portion 3 and a lower portion 4, which are securely joined to each other. In particular, the two portions are clip-fastened to each other, but other fastening systems may be envisaged.

FIG. 3 shows the lighting module 1 without the upper portion 3 of the casing 2, so as to expose the interior of the lighting module 1.

It may thus be seen that the lighting module 1 moreover comprises, housed in the casing 2, a light-emitting assembly comprising at least one light source 7, which is placed at the focal point or in the vicinity of the focal point of a reflector 8 of parabolic or substantially parabolic shape.

The light source 7 emits light mainly in the direction of the reflector 8, which has a reflective surface allowing the rays to be redirected toward an image focal point of the reflector, in the direction of the shaping lens. The light source 7 used may be a filament-, plasma-, or gas-based light source, or comprise electroluminescent elements such as light-emitting diodes LEDs or an organic light-emitting diode OLED, or comprise any other type of light source meeting the constraints of the automotive field.

The reflected light rays 9 then reach the shaping lens 10, by means of which they are deviated so as to form, on exiting the lens, a regulatory light beam 11 meeting the desires of a user of the vehicle, both in terms of its shape and in terms of its direction. The light beam 11 is thus projected, for example toward in front of the vehicle 100 in order to light the route taken or to provide a signalling function. The light beam 11 obtained is divergent, i.e. the light rays from which it is formed seem to come from the same point. In addition, the light beam 11 obtained is collimated, i.e. the light rays from which it is composed are parallel or almost parallel, this allowing lighting that is long-range and uniform, and therefore more comfortable for the driver of the vehicle, to be obtained.

The emitting assembly is placed on a plinth 13 that is itself positioned on the lower portion 4 of the casing 2. This arrangement may more particularly be seen in FIGS. 4 and 5. The plinth 13 comprises a plurality of fastening holes 15 corresponding to as many fastening holes in the emitting assembly, so as to allow the emitting assembly to be secured to the plinth 13 by fastening means, for example a screw. The plinth 13 also comprises fastening orifices 17 allowing the plinth 13 to be fastened to the casing 2 of the headlamp 150, and more particularly to the lower portion 4 of the casing 2.

The sink 5 with which the headlamp 150 described here is equipped is a finned sink, the fins transferring heat from the sink to the air surrounding the sink 5, this possibly decreasing the temperature of the sink 5. Other types of sink may be envisaged without violating the spirit of the invention. The sink 5 is arranged in contact with the plinth 13, the reflector 8 being positioned between the light sources 7 and the sink 5. The plinth 13 is made of a material allowing heat to be transferred between the light sources 7 and the sink 5, so as to allow heat to be removed from the emitting assembly to the sink 5 then to the surrounding air, this thus allowing overheating of the emitting assembly to be avoided. The material used may for example be a metal or a metal alloy.

The shaping lens 10 comprises an entrance face 12 for the light rays 9, and an exit face 14 for the light rays 9, the exit face 14 being opposite the entrance face 12 with respect to a central layer 36 of the lens 10. The light rays 9 emitted by the light source 2 reach the entrance face 12, and pass through the lens 10 in order to exit via the exit face 14 of the lens 10.

Such as schematically shown in FIGS. 5 and 6 in particular, the shaping lens 10 comprises two distinct sections, namely a first section 32, called the lighting optical section, and a second section 36, called the lighting neutral section. The first section 32 lies substantially at the centre of the lens and it is of oval or circular shape, whereas the second section 36 extends laterally with respect to the first section 32, where appropriate on either side of this first section as shown in FIG. 5, and it has an elongate shape. It will be understood from the exploded representation of FIG. 5, as from the schematic representation of FIG. 7, that the shaping lens is arranged in the lighting module according to the invention so that its first section 32 is placed facing, relatively to the optical axis of the lighting module, the emitting assembly, in order that the rays emitted by this emitting assembly mainly pass through this first section 32.

Such as is more particularly shown in FIGS. 6 and 7, the two sections comprise features 30 on the exit face 14 of the lens 10. The shape and the arrangement of the features 30 will be detailed further on in the text.

The shaping lens 10 takes the form of a flat lens, i.e. a lens the thickness, i.e. the dimension between the entrance face 12 and the exit face 14, of which is constant or substantially constant over the entirety of the lens 10. In addition, the thickness of the lens is small with respect to the largest dimension of the exit face 14, in a ratio lower than 1 to 5. Thus, the flat lens 10 mainly lies in a plane.

The entrance face 12 of the lens is convex, i.e. it has a curved profile, a centre of the entrance face 12 being more distant from the central layer 36 than an end of the entrance face 12. In this arrangement, the entrance face 12 has a curved shape.

In the example described here, the lens 10 is of polygonal shape, and more specifically here a hexagon having an arrow-tip shape, but it will be understood on reading what follows that other shapes may be envisaged for the flat lens.

The lens 10 is here positioned with an inclination-angle value substantially equal to 5° with respect to a plane perpendicular to the optical axis, but it will be understood that this arrangement is given here by way of example and does not restrict the scope of the invention nor indeed illustrate a preferred embodiment. In particular, the lens 10 may extend perpendicularly to an axis 16 that is coincident with an optical axis of the lens 10.

FIG. 6 illustrates an alternative configuration of the lens 10 for shaping the light rays, which differs in particular in its shape. The lens 10 has an attribute in common with the lens shown in FIGS. 2 to 5, in that it is a flat lens of slender general shape, but here has a pentagonal shape.

Such as was introduced above, the exit face 14 of a shaping lens 10 according to one aspect of the invention comprises a plurality of features 30. In the example illustrated in FIGS. 6 and 7, these features 30 are arranged in concentric ring sections or rings around a centre 20 and the features 30 have a cross section of triangle shape. The features 30 may in particular have a Fresnel structure, such as will be described below.

The features 30 are continuous between the centre 20 and an exterior border 22 of the lens 10, i.e. a feature 30 is always in contact with at least one other feature 30, without interruption. A feature 30 is thus always flanked by two adjacent features 30, the only exception being a feature 30 arranged at the centre 20, which is called the central feature 24, and a feature 30 arranged on the periphery of the lens 10, i.e. in contact with the exterior border 22 of the lens 10, which is called the terminal feature 26. The features 30 placed between the central feature 24 and the one or more terminal features 26 are called peripheral features 28.

The central feature 24 is of spherical shape. This central feature 24 is positioned on an optical axis of the lens 10. In the example illustrated here, the optical axis of the lens 10 corresponds to the axis 16 illustrated in FIG. 4.

The terminal features 26 and the peripheral features 28 may in particular take the form of a ring section or ring, of curved or triangular cross section such as mentioned above.

The set of features 30 arranged on the exit face 14 of the lens may have a Fresnel structure, a succession of prisms being arranged concentrically from the central feature 24 to the terminal features, the features arranged in the second section 36, laterally to the first section 32, possibly having a height and a width that are identical to those of the features arranged in the first section 32 nearest the junction between the two sections. Depending on the optical power that it is desired to give to the lens, the cross section of the prisms arranged in the first section may have right sides or indeed have sides that are curved or complex, and the cross section of the prisms arranged in the second section may have the same profiles with a view to increasing uniformity or creating a distinction between the two sections of the exit face.

This arrangement provides the exit face 14 with a Fresnel-lens shape, with a first section 32 that forms an optical section for the lighting of the vehicle, i.e. onto which the light rays emitted by the emitting assembly are directed, and a second section 36 that forms a lighting neutral section, i.e. that transmits few or none of the light rays emitted by the emitting assembly.

In the same lighting optical section and neutral section context, it is also possible to classify features located in the first section 32 as being features of a first type 34 and the features 30 located in the second section 36 as being features of a second type 38. In accordance with the above, the set of features 30 of the exit face 14 may have a Fresnel structure, with features of the first type 34 that differ from the features of the second type 38 in the inclination value of the face thereof that forms the dioptric interface thereof. According to a first variant embodiment, the features of a first type 34 may have a Fresnel structure whereas the features of a second type 38 take the form of a graining. In either one of these variants, the pitch of the Fresnel structure may be constant over the entirety of the flat lens.

FIG. 7 schematically shows a lens 10 for shaping light rays and a light source 7 that forms an assembly for emitting these rays, the latter being schematically shown by lines and arrows in the figures.

The light source 7 emits light rays 9 that are directed toward the shaping lens 10, where appropriate via a reflector such as has been shown in FIGS. 3 to 5. Since the light source 7 is placed at the focal point or substantially at the focal point of the lens, the light rays 9 are deviated by the lens 10 so as to lie, on exiting the latter, parallel or substantially parallel to one another, so as to form a regulatory light beam 11.

Such as described above, the emitting assembly and the shaping lens are arranged so that the light rays 9 mainly reach the first section 32 of the shaping lens 10. Thus, the first section 32 is a lighting optical section, via which the rays pass, and the second section 36 is a lighting neutral section, via which no or very few rays, with regard to the dimension of this second section, emitted by this light source pass. More particularly, fewer than 10% of the light rays 9 emitted by the emitting assembly reach a second section 36 of the lens 10, whereas the area over which the second section extends is at least equal to 30% of the area over which the first section extends.

The entrance face 12 of the shaping lens 10 may be smooth, i.e. it comprises no optical element able to affect the direction of the incident light rays 9, or indeed it may be patterned, for example with a microstructure, so as to allow the clearness of the beam to be managed with a view to conforming to regulations.

As explained above, the exit face 14 of the lens 10 for its part comprises a plurality of features 30, which are placed in circles that are concentric about one another, from the centre 20 to the exterior border 22.

The features 30 of the exit face 14 are characterized by a height 52, comprised between 1 micron and 1 millimetre, and which may in particular be comprised between 50 and 300 microns. The height 52 of a feature is the dimension of this feature in the longitudinal direction L, measured between the exit face 14 and a vertex 42 of the feature 30, the vertex 42 being the point of the feature 30 most distant from the exit face 14, in the longitudinal direction L.

The features 30 are arranged on the exit face so as to be rotationally asymmetric. More particularly, the height 52 of a feature 30 may vary depending on the zone of the exit face in which the feature 30 is, and the prismatic power of a given feature 30 differs depending on the zone in question. By way of example, in the first section 32, the exit face is arranged so that the prismatic power of the features varies as a function of the position of the features in the vertical direction V. Thus, the prismatic power generated in that portion of a feature 30 which is placed in an upper portion 26 of the lens 10, the notion of upper portion being defined with respect to the arrangement of the lens in the vehicle, is higher than the prismatic power generated in a second portion of the same feature that is placed symmetrically in the lower portion of the lens 10. The aim is thus to ensure that the lighting creates as little glare as possible. In the second section 36, the rotational asymmetry of the features may take another form since this second section is lighting neutral and, thus, a rotational asymmetry may be generated that consists in features the shapes of which extend non-regularly around an axis of concentricity of the features of the first section.

Two points of the feature 30 that are images of each other via a symmetry with respect to a vertical plane passing through the centre 20 have the same prismatic power. In other words, two points of the exit face 14 that are placed in the same plane parallel to the longitudinal direction L and to the transverse direction T have the same prismatic power. It will be understood that only the vertical direction has an effect on the prismatic power, with a view to decreasing the potential glare experienced by a road user in front of the vehicle equipped with the headlamp according to the invention.

The arrangement of the features 30 is also characterized by a pitch 50 between two successive features comprised between 100 microns and 1 millimetre, the pitch being measured between the vertex of a first feature and the vertex of a directly neighbouring second feature. It will be understood that the pitch between the features may be regular over the entire exit face, or indeed, such as is illustrated in FIG. 7, the pitch between successive features 30 may decrease with distance from the centre 20, in the second section 36. Thus, in this second section 36, the features 30 may be particularly narrow and form a graining.

FIG. 8 shows a front view of the shaping lens 10. This arrangement particularly illustrates the shape and size of the second section 36 of the lens 10 extending laterally with respect to the first section 32, through which section a light spot 40 representative of the light emission of the emitting assembly facing the lighting optical section of the shaping lens has been illustrated.

More particularly, the second section has at least one tip 37, and this tip lies at distance from the first section 32. Thus, it is possible to implement this ray-shaping lens 10 in a lighting module that has a slender shape in order to give the vehicle a specific visual aspect when the lighting module is providing a lighting function.

Such as was specified above, the area over which the second section extends is at least equal to 30% of the area over which the first section extends. It is for example notable in the illustrated embodiment that the largest dimension of the second section, in the transverse direction t, is substantially equal to the dimension of the first section in the same transverse direction.

According to one variant (not shown) the extent of the second section 36, forming a neutral space in the shaping lens 10, and therefore a space available for functions other than the lighting function, may allow the implementation of an additional light source placed facing the lens so as to be located more specifically facing the second section 36 of this shaping lens. Thus, most of the light rays emitted by the additional light source pass through the shaping lens 10 via the second section 36.

This additional light source may be used conjointly with an optic for shaping the light rays emitted by the additional source. The shaping optic is placed between said additional light source and the second section 36 of the lens 10. The combination of a shaping optic and of this additional light source may for example allow a signalling function, and for example a daytime-running-light function, to be provided.

Of course, various modifications may be made by those skilled in the art to the shaping lens according to the invention, provided that a shaping lens comprising at least two sections that differ from each other in the number of light rays that pass through either of the sections, and the exit face of which includes features over the entirety of its area, is implemented.

In any case, the invention is not limited to the embodiment specifically described in this document, and particularly encompasses any equivalent means and any technically workable combination of these means.

The invention claimed is:

1. Lighting module for the lighting and/or signalling of a motor vehicle, including at least one light-emitting assembly and one lens for shaping the light rays emitted by the emitting assembly, said lens having an entrance face for the light rays, which face is turned toward the emitting assembly, and an exit face, which face is opposite the entrance face, wherein the lens for shaping the light rays is a flat lens, said lens and the emitting assembly being configured so that the exit face includes a first section and a second section that differ in the amount of light rays exiting from the lens via one or other of the sections so that the first section forms a lighting optical section and so that the second section forms a lighting neutral section, wherein the second section extends from the first section so as to have a largest dimension that is larger than the thickness of the flat lens, and wherein the exit face of the lens includes features over the entirety of its area.

2. Lighting module according to claim 1, wherein the emitting assembly and the lens are configured so that the light rays emitted by the emitting assembly strike a small section of the entrance face of the lens.

3. Lighting module according to claim 1, wherein the features extend continuously over the exit face of the lens.

4. Lighting module according to claim 1, wherein the features are of a first type in the first section and of a second type in the second section.

5. Lighting module according to claim 4, wherein the features of the first type have a Fresnel structure.

6. Lighting module according to claim 5, wherein the features of the second type form a graining of the second section of the exit face.

7. Lighting module according to claim 4, wherein all of the features have a Fresnel structure.

8. Lighting module according to claim 7, wherein the features of the second type present in the second section have an inclination value of their face different from that of the features of the first type present in the first section.

9. Lighting module according to claim 7, wherein the pitch of the Fresnel structure is constant over the entirety of the flat lens.

10. Lighting module according to claim 7, wherein the second section of the lens has a shape including at least one angular vertex.

11. Lighting module according to claim 10, wherein the exit face is covered with a device for modifying the transmission of the light.

12. Lighting module according to claim 11, wherein the entrance face for the rays is convex.

13. Lighting module according to claim 12, wherein it includes an additional light source placed facing the lens so as to be located directly in line with the second section.

14. Lighting module according to claim 13, wherein the lighting module includes an optic for shaping rays between said additional light source and the second section of the lens.

15. Lighting module according to claim 14, wherein the lens is inclined with respect to a plane perpendicular to the optical axis.

16. Headlamp for a motor vehicle, said headlamp including a lighting module according to claim 1, wherein the lighting module includes a casing for housing at least this lighting module, said casing being closed by a protective outer lens.

17. Lighting module according to claim 2, wherein the features extend continuously over the exit face of the lens.

18. Lighting module according to claim 2, wherein the features are of a first type in the first section and of a second type in the second section.

19. Lighting module according to claim 8, wherein the second section of the lens has a shape including at least one angular vertex.

20. Headlamp for a motor vehicle, said headlamp including a lighting module according to claim 2, wherein the lighting module includes a casing for housing at least this lighting module, said casing being closed by a protective outer lens.

* * * * *